(12) United States Patent
Gagliardo et al.

(10) Patent No.: US 11,043,682 B2
(45) Date of Patent: Jun. 22, 2021

(54) METHOD TO DETECT FUEL CELL GAS LEAK

(71) Applicant: GM GLOBAL TECHNOLOGY OPERATIONS LLC, Detroit, MI (US)

(72) Inventors: Jeffrey J. Gagliardo, Clarkston, MI (US); Stephen D. Pace, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 1202 days.

(21) Appl. No.: 15/401,798

(22) Filed: Jan. 9, 2017

(65) Prior Publication Data

US 2018/0198141 A1 Jul. 12, 2018

(51) Int. Cl.
| | | |
|---|---|---|
| *H01M 8/04664* | (2016.01) | |
| *H01M 8/04537* | (2016.01) | |
| *H01M 8/0438* | (2016.01) | |
| *H01M 8/04992* | (2016.01) | |
| *H01M 8/04746* | (2016.01) | |
| *H01M 8/04791* | (2016.01) | |

(52) U.S. Cl.
CPC ... *H01M 8/04664* (2013.01); *H01M 8/04388* (2013.01); *H01M 8/04574* (2013.01); *H01M 8/04753* (2013.01); *H01M 8/04798* (2013.01); *H01M 8/04992* (2013.01)

(58) Field of Classification Search
CPC ......... H01M 8/04664; H01M 8/04753; H01M 8/04798; H01M 8/04574; H01M 8/04388; H01M 8/04992; H01M 8/04097; H01M 8/04223; H01M 8/04402; H01M 8/04679; G01M 3/26; Y02E 60/50
USPC ..................................... 702/51; 429/444, 446
See application file for complete search history.

(56) References Cited

U.S. PATENT DOCUMENTS

| | | | |
|---|---|---|---|
| 8,349,509 B2* | 1/2013 | Yoshida ............ | H01M 8/04365 429/444 |
| 8,470,486 B2* | 6/2013 | Sato .................. | H01M 8/04783 429/446 |
| 8,563,191 B2* | 10/2013 | Katano ............. | H01M 8/04686 429/444 |
| 9,142,846 B2* | 9/2015 | Maenaka .......... | H01M 8/04223 |

* cited by examiner

*Primary Examiner* — John H Le
(74) *Attorney, Agent, or Firm* — Cantor Colburn LLP

(57) ABSTRACT

A method for determining if there is a gas leak in an anode volume of a fuel cell stack in a fuel cell system. The method includes determining a total amount of gas loss in the anode volume of the fuel cell stack during a predetermined period of time, and monitoring losses of the gas from the anode volume during the predetermined period of time, such as reaction losses, crossover losses and overboard losses. The method also includes subtracting the losses of the gas from the total amount of gas loss to get an anode leak loss and comparing the anode leak loss to a predetermined threshold to identify a hydrogen gas leak.

20 Claims, 1 Drawing Sheet

METHOD TO DETECT FUEL CELL GAS LEAK

BACKGROUND OF THE INVENTION

Field of the Invention

This invention relates generally to a system and method for detecting a gas leak in an anode sub-system of a fuel cell system and, more particularly, to a system and method for detecting a gas leak from an anode sub-system of a fuel cell system during a leak detection condition, which could be a zero net power request or power sink to the fuel cell system, such as during system shut-down, start-up, wake-up, stand-by, etc., where the method includes determining the amount of gas that permeates through the membrane in fuel cells from the anode side to the cathode side, determining the amount of gas that is lost through seals, valves and gaskets, determining the amount of hydrogen gas that is used by an electro-chemical reaction, adding those amounts together, and subtracting the added amount from the total gas loss to determine if that difference is greater than a predetermined threshold, which would indicate a leak.

Discussion of the Related Art

A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The electrons from the anode cannot pass through the electrolyte, and thus are directed through a load to perform work before being sent to the cathode. Proton exchange membrane fuel cells (PEMFC) are a popular fuel cell type for vehicles, and generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer, where the catalytic mixture is deposited on opposing sides of the membrane. The combination of the anode catalytic mixture, the cathode catalytic mixture and the membrane define a membrane electrode assembly (MEA). The membranes block the transport of gases between the anode side and the cathode side of the fuel cell stack while allowing the transport of protons to complete the anodic and cathodic reactions on their respective electrodes.

Several fuel cells are typically combined in a fuel cell stack to generate the desired power. A fuel cell stack typically includes a series of flow field or bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs in the fuel cells are permeable and thus allow nitrogen in the air from the cathode side of the stack to permeate through and collect in the anode side of the stack, often referred to as nitrogen cross-over. Even though the anode side pressure may be slightly higher than the cathode side pressure, cathode side partial pressures will cause air to permeate through the membrane. Nitrogen in the anode side of the fuel cell stack dilutes the hydrogen such that if the nitrogen concentration increases above a certain percentage, such as 50%, fuel cells in the stack may become starved of hydrogen. If a fuel cell becomes hydrogen starved, the fuel cell stack will fail to produce adequate electrical power and may suffer damage to the electrodes in the fuel cell stack. Thus, it is known in the art to provide a bleed valve in the anode exhaust gas output line of the fuel cell stack to remove nitrogen from the anode side of the stack. The fuel cell system control algorithms will identify a desirable minimum hydrogen gas concentration in the anode, and cause the bleed valve to open when the gas concentration falls below that threshold, where the threshold is based on stack stability.

It is known in the art to estimate the molar fraction of gases in the anode side of a fuel cell stack using a model to determine when to perform the bleed of the anode side or anode sub-system. For example, gas concentration estimation (GCE) models are known for estimating hydrogen, nitrogen, oxygen, water vapor, etc. in various volumes of a fuel cell system, such as the anode flow-field, anode plumbing, cathode flow-field, cathode header and plumbing, etc.

Gas leaks from the anode sub-system in a fuel cell system are a major concern because the hydrogen gas species present in the mixture may impact overall system efficiency and product safety. For example, there could be significant safety concerns resulting from bipolar plate and/or seal ruptures that can be catastrophic to an otherwise repairable fuel cell stack and possibly create a dangerous environment for the vehicle operator. Further, because of emissions requirements, hydrogen gas leak detection must be accurate to ensure compliance and enable reactive actions when gas is lost from the anode sub-system. Also, prevention of false positives must be avoided because any leak will inconvenience the vehicle operator.

SUMMARY OF THE INVENTION

The following discussion discloses and describes a system and method for detecting a gas leak from an anode sub-system in a fuel cell stack during a leak detection condition, which could be a zero net power request or power sink to the fuel cell system, such as during system shut-down, start-up, wake-up, stand-by, etc. The method determines the total amount of molecular gas in the anode volume of the fuel cell stack at a start of a leak detection time period during the leak detection condition. The method also determines a crossover loss of the gas from the anode volume of the fuel cell stack during the leak detection time period as a result of permeation through membranes in the fuel cell stack, determines an overboard loss of the gas from the anode volume of the fuel cell stack during the leak detection time period as a result of permeation through other components, such as gaskets, valves and seals, in the fuel cell stack, and determines a reaction loss of the hydrogen gas from the anode volume of the fuel cell stack during the leak detection time period as a result of an electro-chemical reaction in the stack. The method also determines the total amount of molecular gas in the anode volume of the fuel cell stack at the end of the leak detection time period and subtracts it from the gas present in the anode volume at the start of the leak detection condition giving the total gas loss. The method adds the crossover, overboard and reaction losses to get an added loss, subtracts the added loss from the total gas loss to get a leak loss from the anode volume, and compares the anode leak loss to a predetermined threshold to determine whether a significant enough gas leak is present.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for detecting a gas leak from an anode sub-system in a fuel cell system is merely exemplary in nature, and is in no way intended to limit the invention or its applications or uses. For example, the fuel cell system discussed herein has particular application for use on a vehicle. However, as will be appreciated by those skilled in the art, the system and method of the invention may have other applications.

Figure 1:
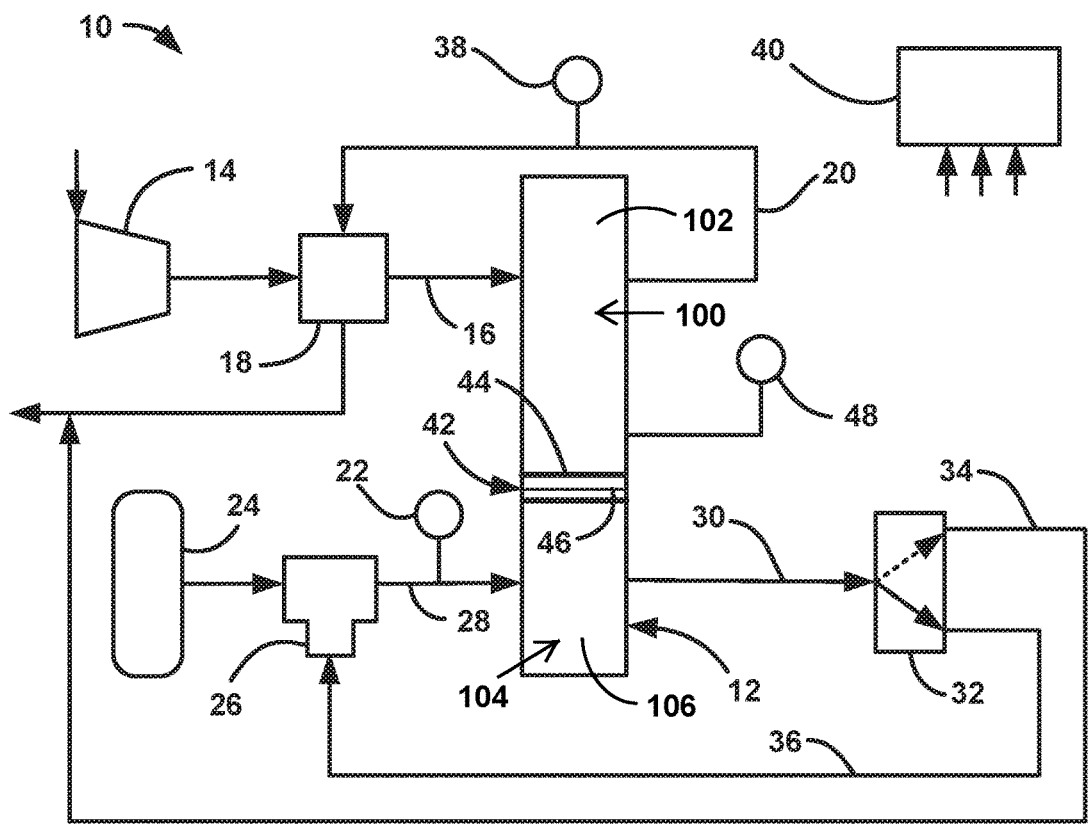
FIG. 1 is a simplified schematic block diagram of a fuel cell system.

FIG. 1 is a schematic block diagram of a fuel cell system 10 including a fuel cell stack 12. The stack 12 includes a series of fuel cells of the type discussed above, represented generally by a fuel cell 42 including opposing bipolar plates 44 having an MEA 46 therebetween. Opposing bipolar plates 44 separate a cathode side 100 of fuel cell 12 having a cathode volume 102 from an anode side 104 of fuel cell 12 having an anode volume 106. A compressor 14 provides an airflow to the cathode side of the fuel cell stack 12 on a cathode input line 16 through a water vapor transfer (WVT) unit 18 that humidifies the cathode input air. A cathode exhaust gas is output from the stack 12 on a cathode exhaust gas line 20 that directs the cathode exhaust gas to the WVT unit 18 to provide the water vapor to humidify the cathode input air. The fuel cell system 10 also includes a source 24 of hydrogen fuel, typically a high pressure tank, that provides hydrogen gas to an injector 26 that injects a controlled amount of the hydrogen gas to the anode side of the fuel cell stack 12 on an anode input line 28. Although not specifically shown, one skilled in the art would understand that various pressure regulators, control valves, shut-off valves, etc. would be provided to supply the high pressure hydrogen gas from the source 24 at a pressure suitable for the injector 26.

An anode effluent output gas is output from the anode side of the fuel cell stack 12 on an anode output line 30, which is provided to a bleed valve 32. As discussed above, nitrogen cross-over from the cathode side of the fuel cell stack 12 dilutes the hydrogen gas in the anode side of the stack 12, thereby affecting fuel cell stack performance. Therefore, it is necessary to periodically bleed the anode effluent gas from the anode sub-system to reduce the amount of nitrogen in the anode sub-system. When the system 10 is operating in a normal non-bleed mode, the bleed valve 32 is in a position where the anode effluent gas is provided to a recirculation line 36 that recirculates the anode gas to the injector 26 to operate it as an ejector and provide recirculated hydrogen gas back to the anode input of the stack 12. When a bleed is commanded to reduce the nitrogen in the anode side of the stack 12, the bleed valve 32 is positioned to direct the anode effluent gas to a by-pass line 34 that combines the anode effluent gas with the cathode exhaust gas on the line 20, where the hydrogen gas is diluted to a level suitable for the environment. A cathode pressure sensor 38 measures the pressure in the cathode sub-system of the fuel cell system 10, an anode pressure sensor 22 measures the pressure in the anode sub-system of the fuel cell system 10, and a temperature sensor 48 measures the temperature of the fuel cell stack 12. The pressure and temperature signals from the sensors 38, 22 and 48 are provided to a controller 40, which the signals may be used in gas concentration models, permeation rates, and other information consistent with the discussion herein to determine whether a significant anode gas leak is occurring in the system 10.

As will be discussed in detail below, the present invention proposes a system and method for identifying gas leaks from the anode sub-system during a leak detection condition, which could be a zero net power request to the fuel cell system, such as during system shut-down, start-up, wake-up, stand-by, etc, that considers the properties and age of the membranes, sub-gaskets, gaskets, seals, valves, etc. to account for known and expected gas transport out of the sealed anode sub-system so as to enhance sensitivity to unexpected or unwanted system leaks. Permeation rates of the gas species provide the ability to more accurately estimate the mass of the gas leaving the anode sub-system as a physical leak. Since permeation rates change over time, comprehension of the estimated leak rates remain accurate over the lifetime of the system 10.

During the leak detection condition, gas permeation continues through the membranes until the gas component partial pressures have equalized on both sides of the membrane. The diffusivity of gas species through the membrane from the anode side to the cathode side is material dependent, for example, hydrogen is approximately three times the rate of nitrogen from the cathode side to the anode side using typical fuel cell polymer electrolyte membranes. Higher hydrogen diffusivity rates equate to a rapid equalization of hydrogen gas species partial pressures compared to a relatively slow equalization of nitrogen partial pressure. The difference in gas diffusivities causes the anode sub-system absolute pressure to drop until the cathode gas species partial pressures reaches the anode gas species partial pressures.

Figure 2:
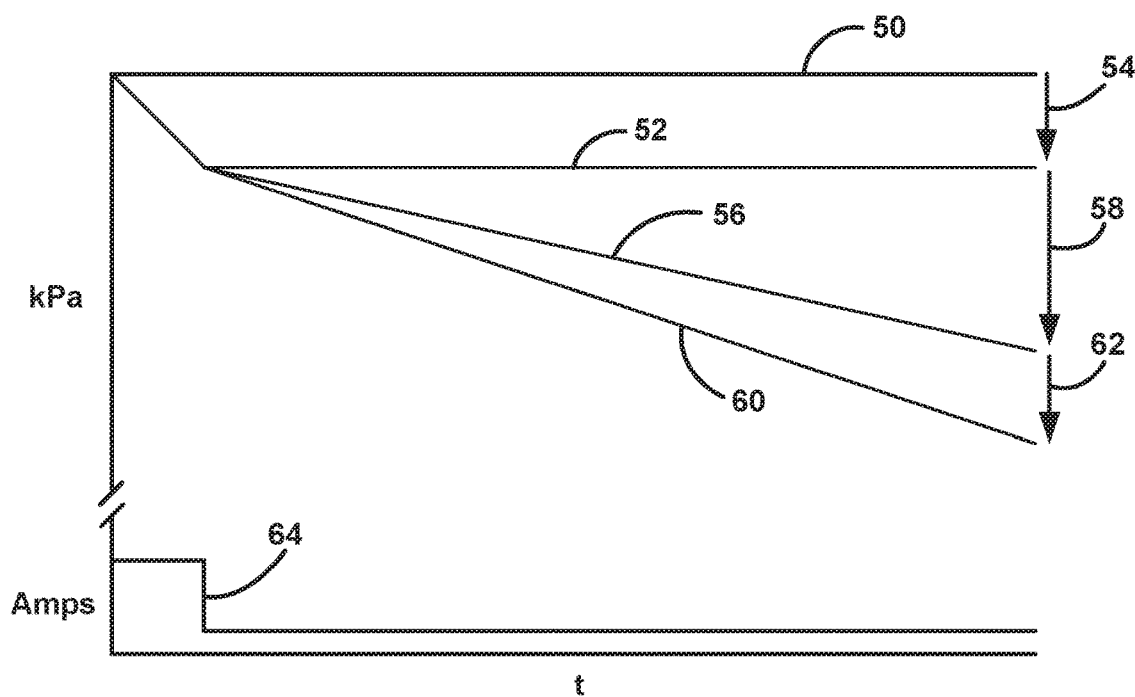
FIG. 2 is a graph with time on the horizontal axis and pressure on the vertical axis showing loss of gas from an anode side of the fuel cell stack at a leak detection condition and including loss of gas as a result of a gas leak.

FIG. 2 is a graph with time on the horizontal axis and anode pressure as measured by, for example, the pressure sensor 22 on the vertical axis. It is noted that using pressure measurements as discussed herein is by way of proxy for the number of moles via the ideal gas law. Other measurements or models may be able to provide the number of moles. If everything else is equal, a loss of molecules, by leak or otherwise, will result in a proportional loss of pressure. Since the system 10 measures pressure it is convenient to represent responses in terms of pressure. If the anode sub-system was perfectly sealed at the leak detection condition, then the gas would be contained therein until the next startup. Graph line 50 represents the anode pressure of an ideal impermeable, leak free system at, for example, 170 kPa at 70° C. After the leak detection condition is present, there still may be a load on the stack 12 to operate accessories or the like, where at least some hydrogen gas in the anode side of the stack 12 would be consumed as a result of the electro-chemical reaction. This loss of hydrogen gas in the anode sub-system is represented herein as a reaction loss $\dot{n}_{reaction}$ and is shown by line 52, where the pressure drop from this loss of hydrogen gas is identified by line 54 and can be, for example, 0.02 A/cm$_2$ for 0.5 s or approximately 3 kPa. The reaction loss $\dot{n}_{reaction}$ shows the expected behavior of the system 10 if current is being generated by the stack 12 and hydrogen gas is being consumed, where the current generation of the stack 12 is represented by line 64.

Since the membranes are permeable to gas species crossing over from the anode side to the cathode side in the fuel cell stack 12, there is a loss of gas in the anode sub-system as a result of this permeation. While the membrane inhibits gas diffusion sufficiently for efficient operation of the fuel cell reaction, the diffusion of gases across the membrane is still substantial, and can be modeled as:

$$\dot{n}_{xovr} = \sum_{x=1}^{m} \frac{D_{x,eff} \cdot (P_{x,Anode} - P_{x,Cathode})}{\delta_{PEM}}, \quad (1)$$

where $\dot{n}_{xovr}$ is the total diffusion rate of the gas from the anode side to the cathode side of the stack 12 in moles/sec, crossover loss, $D_{x,eff}$ is a gas species dependent effective diffusion constant, $\delta_{PEM}$ is the membrane thickness, $P_{x,Anode}$ is the partial pressure of the gas species (x) in the anode side of the stack 12, and $P_{x,Cathode}$ is the partial pressure of the gas species (x) in the cathode side of the stack 12. It is noted that the permeation of the gas through the membranes in the fuel cells 42 increases as the stack 12 ages as a result of various factors, such as pin holes developing in the membranes, the membranes thinning out over time, etc. Those characteristics of the increase in the permeability of the membrane are known in the art and are incorporated into equation (1). Further, the gas species (x) could be, but not limited to, $H_2$, $N_x$ or $O_2$, and the number of gas species considered is (m). The total rate of gas transport across the membrane in moles/s can be converted to the number of moles over a given time step by multiplying by the time step $t_{step}$.

There is also a loss of gas from the anode sub-system due to permeation through gaskets, seals, valves, sub-gaskets, etc. in the fuel cell stack 12, and is represented herein as an overboard loss $\dot{n}_{ovrbrd}$. This permeation of gas out of the anode sub-system can also be modeled using known equations. The integrity of the seals, gaskets, sub-gaskets, valves, etc. as they age and in response to stack use can be incorporated into the gas overboard equations to identify the loss of gas through these components as it increases over time.

The combined permeation of the crossover loss $\dot{n}_{xovr}$ and the overboard loss $\dot{n}_{ovrbrd}$ of the gas through the membranes, gaskets, sub-gaskets, seals, etc. from the anode sub-system is represented by line 56, where line 58 is the loss of pressure in the anode sub-system.

The graph also shows a decay of the pressure in the anode sub-system as a result of small gas leaks, represented by line 60, in addition to those losses of gas discussed above, where line 62 represents the amount of pressure loss in the anode sub-system as a result of the leak.

Based on the discussion above, the amount of gas that may be leaking from the anode sub-system, referred to herein as an anode leak loss $n_{An,leak}$, can be determined as follows. Once the leak detection condition is identified, the algorithm determines a time frame, referred to herein as a predetermined time period, over which the determination of the leak occurs. The algorithm first determines an initial amount of gas in the anode volume of the fuel cell stack 12 at a start time $t_i$ of the predetermined time period using any suitable technique, such as the ideal gas law pV=nRT, where p is pressure, V is volume, R is the universal gas constant, T is temperature and n is the number of moles of the gas. The algorithm then determines the crossover loss $\dot{n}_{xovr}$ of the gas from the anode volume 106 of the fuel cell stack 12 during the predetermined time period as a result of permeation through cell membranes in the fuel cell stack 12, determines the overboard loss $\dot{n}_{ovrbrd}$ of the gas from the anode volume 106 during the predetermined time period as a result of permeation through other components in the fuel cell stack 12, and determines a reaction loss $\dot{n}_{reaction}$ of the gas from the anode volume 106 during the predetermined time period as a result of an electro-chemical reaction from a load on or to the fuel cell stack 12. The algorithm adds the crossover, overboard and reaction losses to get an added loss. The algorithm also determines the final amount of gas in the anode volume 106 at an end time $t_f$ of the predetermined time period, and determines the total gas loss $n_{An,tot}$ in moles from the anode volume 106 by subtracting the final amount of gas from the initial amount of gas. The algorithm then subtracts the added loss from the total gas loss to get an anode leak loss $n_{An,leak}$ in moles, which is compared to a predetermined threshold to identify a gas leak. This relationship is shown in equation (2) below. If the anode leak loss is greater than the predetermined threshold value, then a leak diagnostic can be set in an attempt to identify where the leak is occurring.

$$n_{An,leak} = n_{An,tot} - \Sigma_{t_i}^{t_f}(\dot{n}_{xovr} + \dot{n}_{ovrbrd} + \dot{n}_{reaction})t_{step} \quad (2)$$

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining if there is a hydrogen gas leak in an anode volume of a fuel cell stack in a fuel cell system, said method comprising:
   determining that the fuel cell system is in a leak detection condition;
   determining an initial amount of gas in the anode volume at a start time of a predetermined time period during the leak detection condition;
   determining a crossover loss of the hydrogen gas from the anode volume of the fuel cell stack during the predetermined time period as a result of permeation through cell membranes in the fuel cell stack;

determining an overboard loss of the hydrogen gas from the anode volume of the fuel cell stack during the predetermined time period as a result of permeation through one or more of a gasket, a valve, and a seal arranged in the fuel cell stack;

determining a reaction loss of the hydrogen gas from the anode volume of the fuel cell stack during the predetermined time period as a result of an electro-chemical reaction from a load on or to the fuel cell stack;

adding the crossover, overboard and reaction losses to get an added loss;

determining a final amount of gas in the anode volume at an end time of the predetermined time period;

determining the total gas loss from the anode volume of the fuel cell stack by subtracting the final amount of gas from the initial amount of gas;

subtracting the added loss from the total gas loss to get an anode leak loss; and comparing the anode leak loss to a predetermined threshold to identify a hydrogen gas leak.

2. The method according to claim 1 wherein determining a crossover loss, determining an overboard loss and determining a reaction loss all include using pressure and electrical current measurements in the anode volume of the fuel cell stack.

3. The method according to claim 1 wherein determining an overboard loss includes determining an overboard loss as a result of permeation through gaskets, sub-gaskets, seals and valves in the fuel cell stack.

4. The method according to claim 1 wherein determining a crossover loss and an overboard loss includes considering an age of the membranes and the one or more of the gasket, the valve, and the seal arranged in the fuel cell stack.

5. The method according to claim 1 wherein determining that the fuel cell system is in a leak detection condition includes determining that a zero net power is requested to the fuel cell system.

6. The method according to claim 5 wherein determining that the fuel cell system is in a leak detection condition includes determining that the fuel cell system is in a shut-down, start-up, wake-up or stand-by mode.

7. The method according to claim 1 wherein determining that the fuel cell system is in a leak detection condition includes determining that a power sink is requested to the fuel cell system.

8. The method according to claim 1 wherein the method uses the equation:

$$n_{An,leak} = n_{An,tot} - \sum_{t_i}^{t_f} (\dot{n}_{xovr} + \dot{n}_{ovrbrd} + \dot{n}_{reaction}) t_{step}$$

where $n_{An,leak}$ is the anode leak loss in moles, $n_{An,tot}$ is the total gas loss in moles, $\dot{n}_{xovr}$ is the crossover loss in moles/sec, $\dot{n}_{ovrbrd}$ is the overboard loss in moles/sec, $\dot{n}_{reaction}$ is the reaction loss in moles/sec, $t_i$ is the start time of the predetermined time period, $t_f$ is the end time of the predetermined time period, and $t_{step}$ defines a calculation time step during the predetermined time step.

9. The method according to claim 1 wherein determining an initial amount of gas and a final amount of gas includes determining the number of moles of the gas.

10. A method for determining if there is a gas leak exceeding a predetermined threshold in an anode volume of a fuel cell stack in a fuel cell system, said method comprising:

determining a first total concentration of gas in the anode volume of the fuel cell stack at a first predetermined point in time;

monitoring losses of the gas from the anode volume of the fuel cell stack from the first predetermined point in time to a second predetermined point in time to obtain a stack gas loss;

determining a second total concentration of gas in the anode volume of the fuel cell stack at the second predetermined point in time;

subtracting the first and second total concentration of gas to get a total gas loss; and comparing the total gas loss to the stack gas loss to determine if there is a gas leak exceeding a predetermined threshold.

11. The method according to claim 10 wherein monitoring losses of the gas includes determining a crossover loss of the gas as a result of permeation through membranes in the fuel cell stack, determining an overboard loss of the gas as a result of permeation through gaskets, sub-gaskets, seals and valves in the fuel cell stack, and determining a reaction loss of the gas as a result of an electro-chemical reaction from a load on or a source to the stack.

12. The method according to claim 11 wherein the method includes using the equation:

$$n_{An,leak} = n_{An,tot} - \sum_{t_i}^{t_f} (\dot{n}_{xovr} + \dot{n}_{ovrbrd} + \dot{n}_{reaction}) t_{step}$$

where $n_{An,leak}$ is a difference between the stack gas loss and the total gas loss in moles, $n_{An,tot}$ is the total gas loss in moles, $\dot{n}_{xovr}$ is the crossover loss in moles/sec, $\dot{n}_{ovrbrd}$ is the overboard loss in moles/sec, $\dot{n}_{reaction}$ is the reaction loss in moles/sec, $t_i$ is the first predetermined point in time, $t_f$ is the second predetermined point in time, and $t_{step}$ defines a calculation time step.

13. The method according to claim 11 wherein determining a crossover loss and an overboard loss includes considering an age of the membranes, gaskets, sub-gaskets, seals and valves in the fuel cell stack.

14. The method according to claim 10 wherein monitoring losses of the hydrogen gas includes using pressure and current measurements in the anode side of the fuel cell stack.

15. The method according to claim 10 wherein the predetermined period of time is at stack shut-down, start-up, wake-up or stand-by.

16. A monitoring system for determining if there is a gas leak in an anode side of a fuel cell stack in a fuel cell system, said monitoring system comprising:

means for determining that the fuel cell system is in a leak detection condition;

means for determining an initial amount of gas in the anode volume at a start time of a predetermined time period during the leak detection condition;

means for determining a crossover loss of the hydrogen gas from the anode volume of the fuel cell stack during the predetermined time period as a result of permeation through cell membranes in the fuel cell stack;

means for determining an overboard loss of the hydrogen gas from the anode volume of the fuel cell stack during the predetermined time period as a result of permeation through one or more of a gasket, a valve, and a seal arranged in the fuel cell stack;

means for determining a reaction loss of the hydrogen gas from the anode volume of the fuel cell stack during the predetermined time period as a result of an electrochemical reaction from a load on or to the fuel cell stack;

means for adding the crossover, overboard and reaction losses to get an added loss;

means for determining a final amount of gas in the anode volume at an end time of the predetermined time period;

means for determining the total gas loss from the anode volume of the fuel cell stack by subtracting the final amount of gas from the initial amount of gas;

means for subtracting the added loss from the total gas loss to get an anode leak loss; and means for comparing the anode leak loss to a predetermined threshold to identify a hydrogen gas leak.

17. The monitoring system according to claim 16 wherein the means for determining a crossover loss, the means for determining an overboard loss and the means for determining a reaction loss all use pressure and current measurements in the anode side of the fuel cell stack.

18. The monitoring system according to claim 16 wherein the means for determining an overboard loss determines an overboard loss as a result of permeation through gaskets, sub-gaskets, seals and valves in the fuel cell stack.

19. The monitoring system according to claim 16 wherein the means for determining a crossover loss and an overboard loss consider an age of the membranes and the one or more of the gasket, the valve, and the seal arranged in the fuel cell stack.

20. The monitoring system according to claim 16 wherein the means for determining that the fuel cell system is in a leak detection condition includes determining that a zero net power is requested to the fuel cell system.

\* \* \* \* \*